United States Patent
Yano et al.

(10) Patent No.: US 9,317,784 B2
(45) Date of Patent: Apr. 19, 2016

(54) IMAGE PROCESSING APPARATUS, IMAGE PROCESSING METHOD, AND PROGRAM

(71) Applicant: CANON KABUSHIKI KAISHA, Tokyo (JP)

(72) Inventors: Kotaro Yano, Tokyo (JP); Naotsugu Sagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/970,999

(22) Filed: Aug. 20, 2013

(65) Prior Publication Data

US 2014/0056518 A1 Feb. 27, 2014

(30) Foreign Application Priority Data

Aug. 22, 2012 (JP) ................................ 2012-183451

(51) Int. Cl.
*G06K 9/62* (2006.01)
*G06T 7/00* (2006.01)

(52) U.S. Cl.
CPC ............ *G06K 9/6267* (2013.01); *G06T 7/0081* (2013.01); *G06T 7/0093* (2013.01); *G06T 2207/10024* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| 7,295,711 | B1 * | 11/2007 | Ahuja et al. | 382/225 |
| 2006/0062454 | A1 * | 3/2006 | Fan et al. | 382/164 |
| 2006/0170769 | A1 * | 8/2006 | Zhou | 348/143 |
| 2008/0024485 | A1 * | 1/2008 | Barrett et al. | 345/419 |
| 2010/0128041 | A1 * | 5/2010 | Branets | G06F 17/5018 345/441 |

OTHER PUBLICATIONS

Achanta et al, SLIC Superpixels, 2010, EPFL Technical Report 149300, pp. 1-15.*
Mark Everingham et al., "The PASCAL Visual Object Classes (VOC) Challenge", International Journal of Computer Vision, vol. 88 (2), 2010, pp. 1-34.
Richard Socher et al., "Parsing Natural Scenes and Natural Language with Recursive Neural Networks", ICML 2011, pp. 1-8.
Radhakrishna Achanta et al., "SLIC Superpixels", EPFL Technical Report 149300, Jun. 2010, pp. 1-15.
Pedro F. Felzenswalb et al., "Efficient Graph-Based Image Segmentation", International Journal of Computer Vision, 2004, pp. 1-26.
Navneet Dalal et al., "Histograms of Oriented Gradients for Human Detection", Proceedings of the IEEE Conference on Computer Vision and Pattern Recognition (CVPR2005), pp. 1-8.

* cited by examiner

*Primary Examiner* — David F Dunphy
(74) *Attorney, Agent, or Firm* — Canon USA Inc. IP Division (57) ABSTRACT

An image processing apparatus includes an object detection unit configured to detect a position of an object based on an input image, and a segmentation unit configured to segment, according to a result of detection by the object detection unit, the image into a plurality of regions, each of which includes adjacent similar pixels and has a size determined for each position in the image.

11 Claims, 10 Drawing Sheets

IMAGE PROCESSING APPARATUS, IMAGE PROCESSING METHOD, AND PROGRAM

BACKGROUND OF THE INVENTION

1. Field of the Invention

The present invention relates particularly to an image processing apparatus, an image processing method, and a program that are suitably used for classifying an image into a plurality of classes.

2. Description of the Related Art

In the past, research has been conducted on segmentation of an image into a plurality of meaningful regions (for example, see "The PASCAL Visual Object Classes (VOC) challenge" by M. Everingham, L. Van Gool, C. K. I. Williams, J. Winn, and A. Zisserman, International Journal of Computer Vision. vol. 88 (2), 2010). The process typically uses a method for, first, dividing an image into small regions of superpixels including a plurality of adjacent pixels, and extracting feature amounts from the respective segmented regions. Then, the regions are integrated according to the extracted feature amounts, and the integrated regions are classified into respective categories. For example, according to a method discussed in "Parsing Natural Scenes and Natural Language with Recursive Neural Networks" by Richard Socher, Cliff Lin, Andrew Y. Ng, and Christopher D. Manning, ICML 2011, each region is classified into a class for sky, trees, or roads by a neural network learned in advance.

On the other hand, clustering and graph representation is used as a method for segmenting an image into superpixels as pre-processing (for example, see "SLIC Superpixels" by Radhakrishna Achanta, Appu Shaji, Kevin Smith, Aurelien Lucchi, Pascal Fua, and Sabine Susstrunk, EPFL Technical Report 149300, June 2010, and "Efficient graph-based image segmentation" by Felzenszwalb, P., Huttenlocher, D., International Journal of Computer Vision. 2004).

However, for example, segmenting an image into superpixels using a method discussed in "SLIC Superpixels" or "Efficient graph-based image segmentation" mentioned above, and classifying, using the superpixels which have been segmented, the image into meaningful regions by a method discussed in "Parsing Natural Scenes and Natural Language with Recursive Neural Networks" has yet a problem to be addressed as follows. For example, if an image is coarsely segmented into superpixels, a boundary between objects cannot be accurately extracted. On the other hand, if an image is finely segmented into superpixels to achieve high boundary accuracy, the amount of following processing is increased because the number of superpixels is great.

SUMMARY OF THE INVENTION

The present invention is directed to an image processing apparatus capable of extracting a boundary between objects with high accuracy while preventing the number of superpixels from becoming too great.

According to an aspect of the present invention, an image processing apparatus includes an object detection unit configured to detect a position of an object based on an input image, and a segmentation unit configured to segment, according to a result of detection by the object detection unit, the image into a plurality of regions, each of which includes adjacent similar pixels and has a size determined for each position in the image.

Further features of the present invention will become apparent from the following description of exemplary embodiments with reference to the attached drawings.

DESCRIPTION OF THE EMBODIMENTS

Exemplary embodiments of the invention will be described in detail below with reference to the drawings. In the following, an example of segmenting an image into a plurality of meaningful regions will be described according to a present exemplary embodiment.

Figure 1:
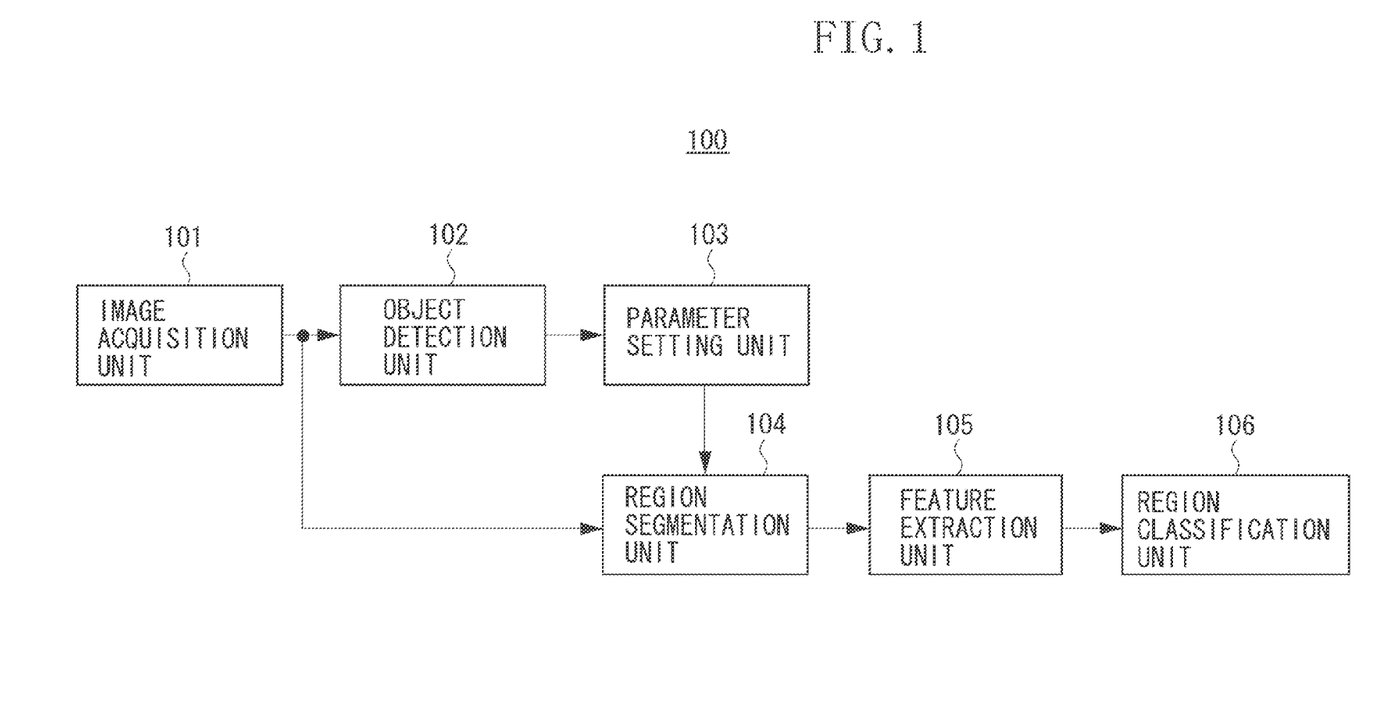
FIG. 1 is a block diagram illustrating an example functional configuration of an image processing apparatus according to exemplary embodiments.

FIG. 1 is a block diagram illustrating an example functional configuration of an image processing apparatus 100 according to the present exemplary embodiment. According to FIG. 1, an image acquisition unit 101 includes an image capturing device for acquiring image data, and an image memory for storing the acquired image data.

An object detection unit 102 includes a hardware circuit for detecting, in the form of a rectangular region, a position of an object in an image. A parameter setting unit 103 sets a parameter for controlling the sizes of regions into which an image is to be segmented, according to the positions in the image. A region segmentation unit 104 segments an image into a plurality of regions including adjacent similar pixels. A feature extraction unit 105 extracts a feature amount from segmented image regions. A region classification unit 106 determines a class to which an image region belongs, based on the extracted feature amount. According to the present exemplary embodiment, the parameter setting unit 103, the region segmentation unit 104, the feature extraction unit 105, and the region classification unit 106 are structured by the functioning of a general-purpose computer.

In the following, an operation according to the present exemplary embodiment will be described. Description will be given below based on an example of segmenting an image into superpixels based on a method discussed in "SLIC Superpixels", and classifying the segmented superpixels by a method discussed in "Parsing Natural Scenes and Natural Language with Recursive Neural Networks".

Figure 2:
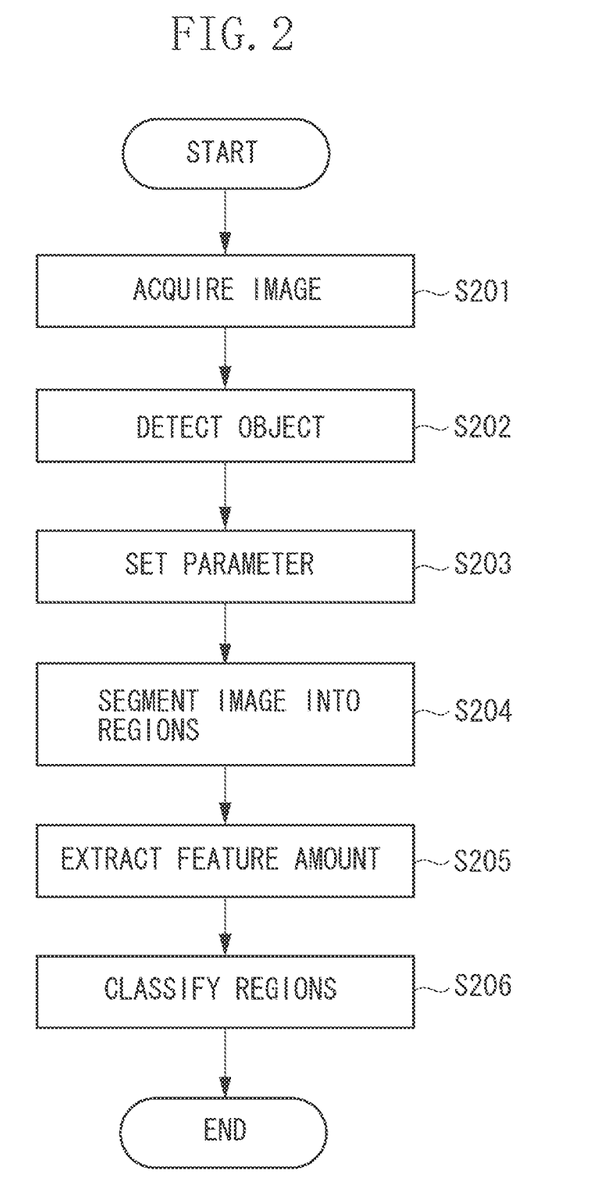
FIG. 2 is a flow chart illustrating an example of a procedure for classifying an image into a plurality of regions according to the exemplary embodiments.

FIG. 2 is a flow chart illustrating an example of a procedure for acquiring image data, and classifying an image into a plurality of regions according to the present exemplary embodiment.

First, in step S201, the image acquisition unit 101 acquires image data, which is to be the target of a region segmentation process, by capturing a subject, and stores the acquired image data in the image memory. The image data acquired at this time is data of a color image including three color components, red (R), green (G) and blue (B).

Next, in step S202, the object detection unit 102 detects, based on the image data acquired in step S201, the position and the size of a person in the form of a rectangular region. A method discussed in "Histograms of Oriented Gradients for Human Detection", for example, is used as the method for detecting a person. In that case, hardware as a Field-Programmable Gate Array (FPGA), for example, is mounted on the object detection unit 102 for performing the person detection method.

Next, in step S203, the parameter setting unit 103 sets a parameter to be used for the region segmentation process to be performed by the region segmentation unit 104, based on the result of step S202 and according to the position in the image. Additionally, details of the process will be given below. Next, in step S204, the region segmentation unit 104 uses the parameter set in step S203, and segments the image acquired in step S201 into a plurality of regions (superpixels) including adjacent similar pixels. Additionally, details of the process will also be given below.

Next, in step S205, the feature extraction unit 105 extracts a feature amount from the superpixel obtained by the segmentation in step S204. The feature amount to be extracted in the present exemplary embodiment includes a color feature, a texture feature, a geometric feature, and a position feature of the superpixel. The color feature is the mean, distribution, skewness, and kurtosis of pixels in the superpixel for each of RGB color components. In addition, the mean, distribution, skewness, and kurtosis of pixels in the superpixel may further be extracted for the color components obtained by converting RGB to YCbCr or CIELAB color space.

The texture feature is the mean, distribution, skewness, and kurtosis of pixels in the superpixel which are extracted for an image obtained by performing Gabor filter processing on a luminance image (Y component of YCbCr) with a plurality of scales and orientations. In addition, the mean, distribution, skewness, and kurtosis of pixels in the superpixel may further be extracted for an image on which Laplacian of Gaussian (LOG) processing has been performed with a plurality of scales.

Furthermore, the geometric feature is the area of pixels (the number of pixels) in the superpixel, the circumferential length (the number of pixels at a region boundary), and a second moment of an x coordinate, a second moment of a y coordinate and an xy moment where the position coordinates of each pixel are represented by (x, y). That is, the position feature is the center of gravity of each of the x coordinate and the y coordinate of a pixel in the superpixel, and the value of $x_g^2 + y_g^2$ where the coordinates of the center of gravity are $(x_g, y_g)$. These feature amounts which have been extracted are stored in a memory of a general-purpose computer for each superpixel, as a d-dimensional feature vector where d is the number of feature amounts extracted from one superpixel.

Figure 3:
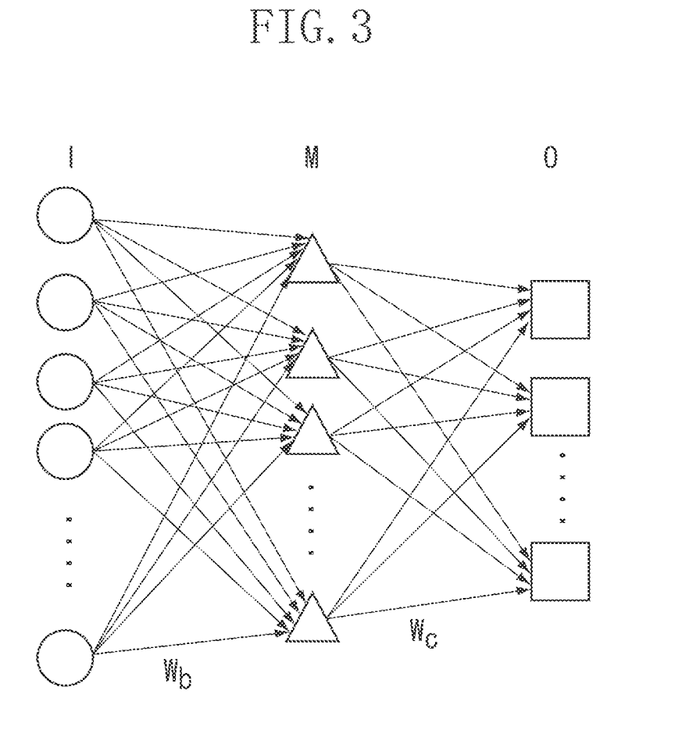
FIG. 3 is a diagram illustrating an example of a three-layer Recursive Neural Networks (RNN).

Next, in step S206, the region classification unit 106 determines the class to which each image region belongs, based on the feature amount extracted in step S205. The class determination in step S206 is performed by three-layer RNN as illustrated in FIG. 3, for example. In FIG. 3, I, M and O are neurons of an input layer, a middle layer, and an output layer, respectively. First, when the feature amount (the d-dimensional feature vector) extracted in step S205 is given as $F_{raw}$, the number of neurons of the input layer I is d, and one feature amount forming the feature vector is input to each of the neurons, and is transmitted as it is to the middle layer M. When the number of middle layers M is $d_m$, and the feature to be output is $F_{sem}$, $F_{sem}$ is a $d_m$-dimensional feature vector, and is calculated by the following equation (1).

$$F_{sem} = f(W_b F_{raw}) \quad (1)$$

Here, $W_b$ is a $d \times d_m$ matrix representing a coupling coefficient of the input layer I and the middle layer M, and f is a sigmoid function.

Also, the output layer O calculates $d_o$ pieces of values $F_{out}$ (a $d_o$-dimensional feature vector) by the following equation (2), and outputs the same.

$$F_{out} = W_c F_{sem} \quad (2)$$

Here, $W_c$ is a $d_m \times d_o$ matrix representing a coupling coefficient of the middle layer M and the output layer O, and $d_o$ is the number of classes to be determined. Additionally, $W_b$ and $W_c$ are determined by prior learning by a method discussed in "Parsing Natural Scenes and Natural Language with Recursive Neural Networks". Then, the region classification unit 106 outputs, as the determination result, a class that returns the largest value, among $F_{out}$ output from the output layer O.

Figure 4:
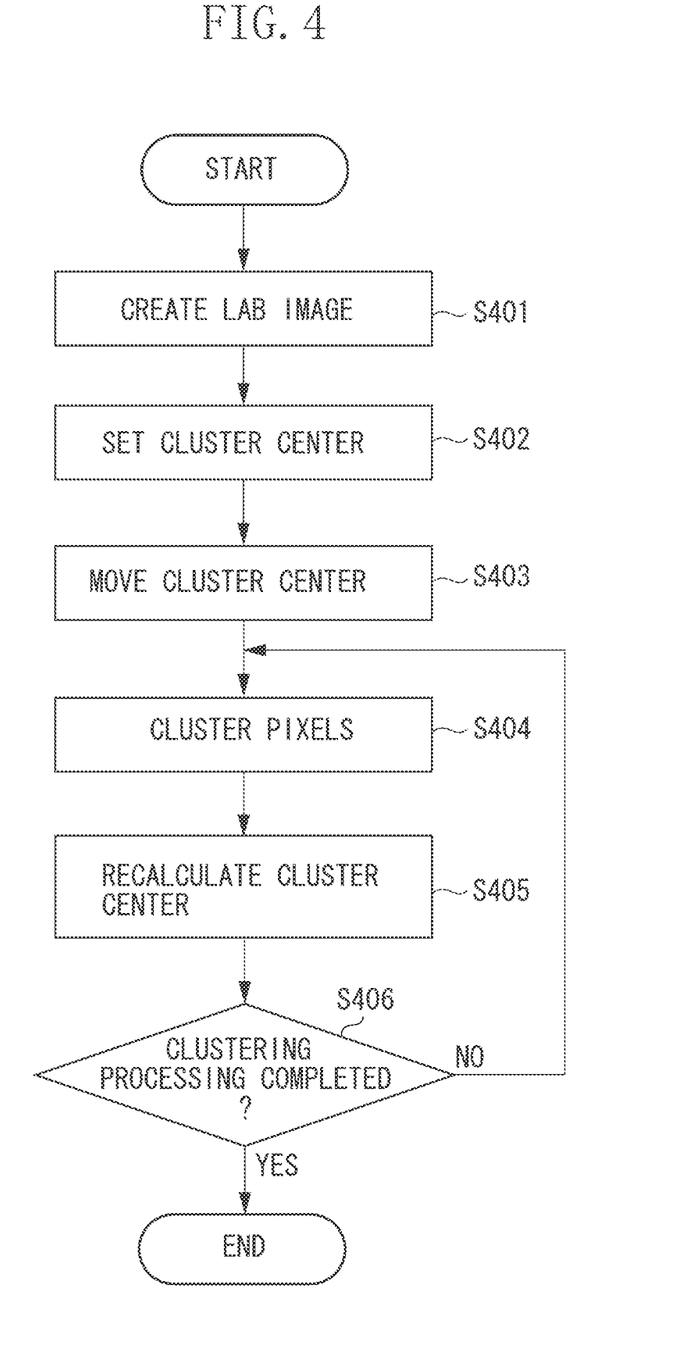
FIG. 4 is a flow chart illustrating an example of a detailed procedure of a region segmentation process according to a first exemplary embodiment.

Next, details of the region segmentation process of step S204 will be given. FIG. 4 is a flow chart illustrating an example of a detailed procedure of the region segmentation process of step S204.

In step S401, first, the region segmentation unit 104 converts an input image including RGB components to a CIELAB color space.

Next, in step S402, the region segmentation unit 104 sets a cluster center for region segmentation by using the parameter set in step S203. In the process, the region segmentation unit 104 sets the cluster center by a method discussed in "SLIC Superpixels". Assuming that the number of pixels of an image to be segmented into regions is N, that the number of segmentations is K, and that the image is to be segmented into superpixels having approximately the same size, the interval S of superpixel centers is a square root of N/K. Accordingly, the region segmentation unit 104 simply equally sets the coordinates of cluster centers at the position of the interval S.

Next, in step S403, the region segmentation unit 104 moves the position of the cluster center set in step S402 to a close pixel position with a small luminance gradient. That is, the luminance gradient is calculated in a 3×3-pixel close region, for example, of the cluster center set in step S402, and the cluster center is moved to the pixel position where the luminance gradient is the smallest. This is to prevent the cluster center from being arranged at the edge or in a noise pixel.

Next, in step S404, the region segmentation unit 104 performs clustering of pixels. In the process, the region segmentation unit 104 calculates the distance measure for all the combinations of the pixel at the cluster center and other pixels, and assigns each pixel other than the cluster center to the cluster center with the smallest distance measure. Here, the region segmentation unit 104 calculates the distance measure $D_s$ by the following equation (3).

$$D_s = D_{lab} + \frac{m}{s} D_{xy} \quad (3)$$

$$D_{lab} = \sqrt{(l_k - l_i)^2 + (a_k - a_i)^2 + (b_k - b_i)^2}$$

$$D_{xy} = \sqrt{(x_k - x_i)^2 + (y_k - y_i)^2}$$

In equation (3), $(l_k, a_k, b_k)$ is CIELAB color space coordinates at a cluster center $(x_k, y_k)$, and $(l_i, a_i, b_i)$ is CIELAB color space coordinates at a pixel $(x_i, y_i)$ other than the cluster center. Also, a weight constant m calculates the distance measure.

Next, in step S405, the region segmentation unit 104 recalculates the cluster center while reflecting the result of clustering performed in step S404. That is, the region segmentation unit 104 calculates the center of gravity of the position coordinates for each cluster, and the center of gravity is made the new cluster center. Also, at this time, the region segmentation unit 104 obtains the amount of positional deviation between the original cluster center and the new cluster center.

Next, the region segmentation unit 104 calculates the sum of the amount of positional deviation between the original cluster center and the new cluster center calculated in step S405 for all the clusters, and determines whether the clustering process is completed, based on the calculated sum. Here, in the case the sum of the amount of positional deviation is greater than a predetermined value, the region segmentation unit 104 determines that the clustering process is not completed (NO in step S406), and the process returns to step S404. On the other hand, in other cases, the region segmentation unit 104 determines that the clustering process is completed (YES in step S406), stores the result of clustering as a superpixel, and ends the process.

Next, the process for setting a parameter based on an object detection result of step S203 in FIG. 2, and the process for setting a cluster center in step S402 in FIG. 4 will be described in detail.

Figure 5A:
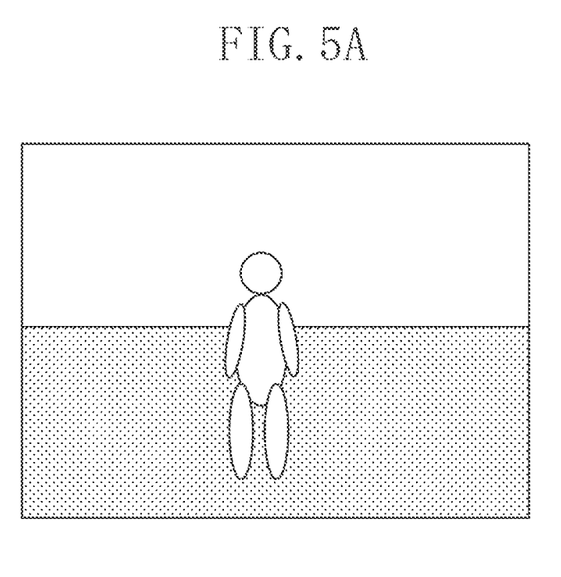
FIGS. 5A and 5B are diagrams illustrating an example of an acquired image and a processing result of detection of a person.
Figure 5B:
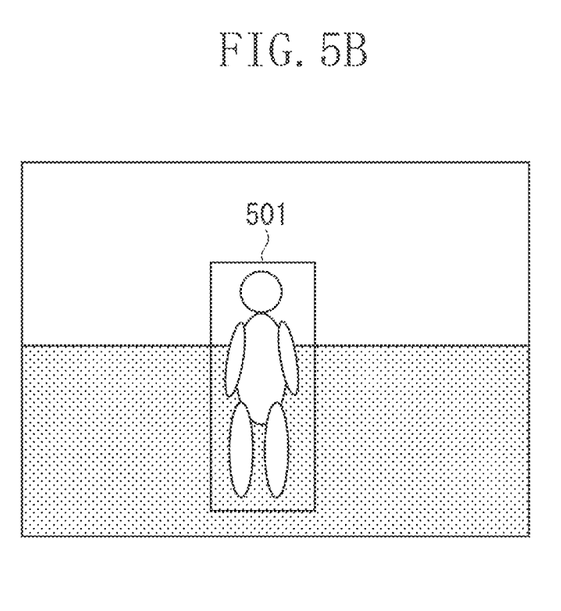

In the process for setting a parameter in step S203 in FIG. 2, the value of the interval S which is used in setting a cluster center in step S402 in FIG. 4 is set according to the position in the image. FIG. 5A illustrates an example of an image acquired in step S201, and FIG. 5B illustrates a result of the process in step S202 in FIG. 2 for detecting a person. A rectangle 501 in FIG. 5B indicates the position of a detected person. First, the interval S is set to a predetermined value $S_0$ for the region outside the rectangle 501. On the other hand, with respect to the region inside the rectangle, the interval S is set for each position based on the prior probability of each position inside the rectangle coinciding with the boundary area of the person. That is, the interval S is set by the following equation (4).

$$S = K \cdot p(x|c) \quad (4)$$

Figure 6:
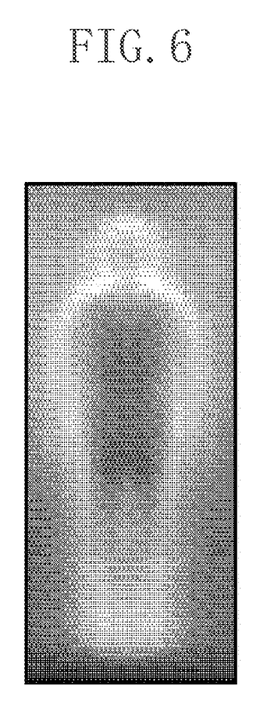
FIG. 6 is a diagram illustrating a visualized probability distribution.
Figure 7:
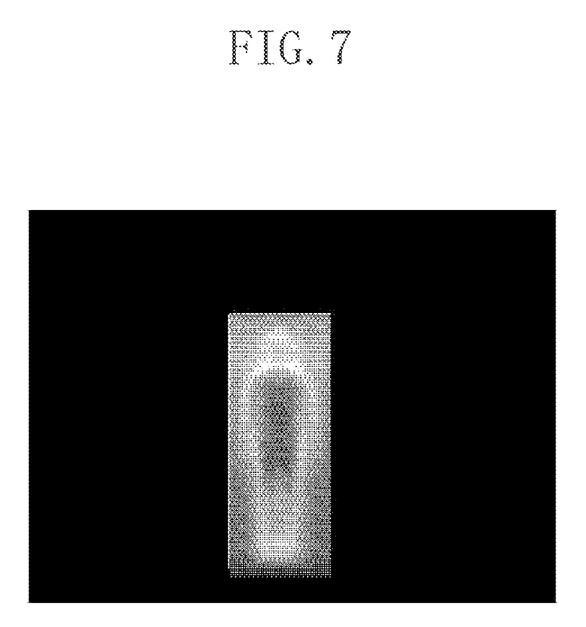
FIG. 7 is a diagram illustrating visualization of a parameter (interval S) that is set.

Here, $p(x|c)$ is a probability distribution obtained from a rectangle detected by the object detection unit 102 processing, in advance, a large number of samples including the person, where the probability distribution is of a pixel at a position x in the rectangle being a boundary c of the person. Also, a predetermined constant K is set such that S is equal to or smaller than $S_0$. FIG. 6 illustrates a visualized probability distribution $p(x|c)$. In FIG. 6, the probability of being a boundary c is higher as the pixel is brighter. Also, FIG. 7 illustrates visualization of the parameter (the interval S) that is set in step S203. In FIG. 7, the parameter (the interval S) is smaller as the pixel is brighter.

In the process for setting a cluster center in step S402 in FIG. 4, the region segmentation unit 104 sets the cluster center using the parameter (the interval S) set in step S203 in FIG. 2. That is, the region segmentation unit 104 takes a predetermined position $x_s$ at the top left of an image as the position of the cluster center to be initially set, acquires the interval S at the position $x_s$, and obtains the position of the next cluster center on the right side in such a way that the interval between the cluster centers will be S. The process is repeated until the right end of the image is reached. In the similar manner, the region segmentation unit 104 obtains the position of the next cluster center in the downward direction in such a way that the interval between the cluster centers will be S. The process is repeated until the lower end of the image is reached.

Figure 8A:
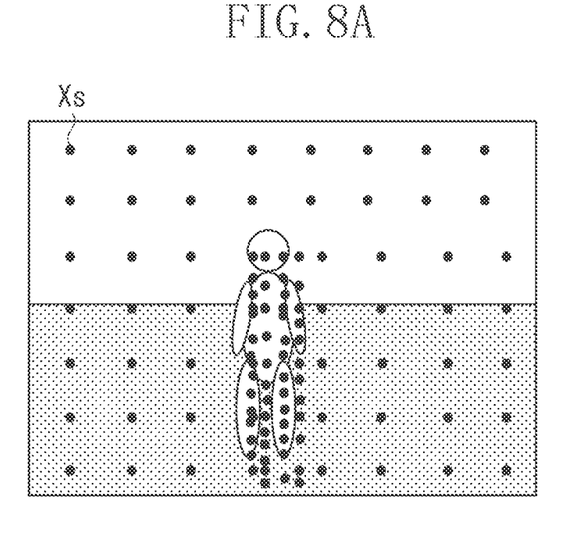
FIGS. 8A and 8B are diagrams illustrating examples of an image where a cluster center is set.
Figure 8B:
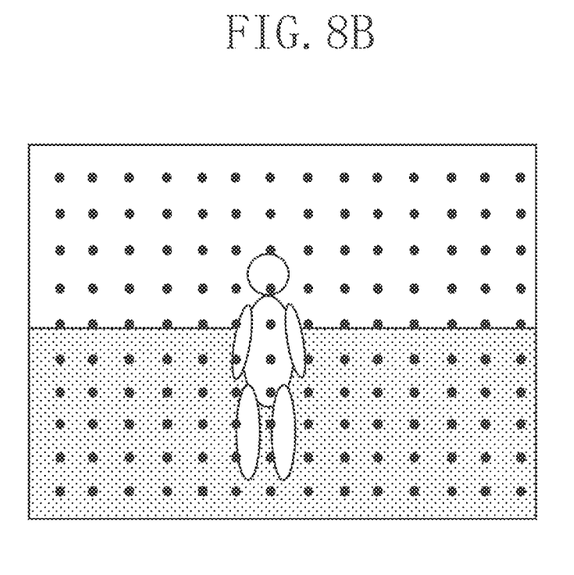
Figure 9A:
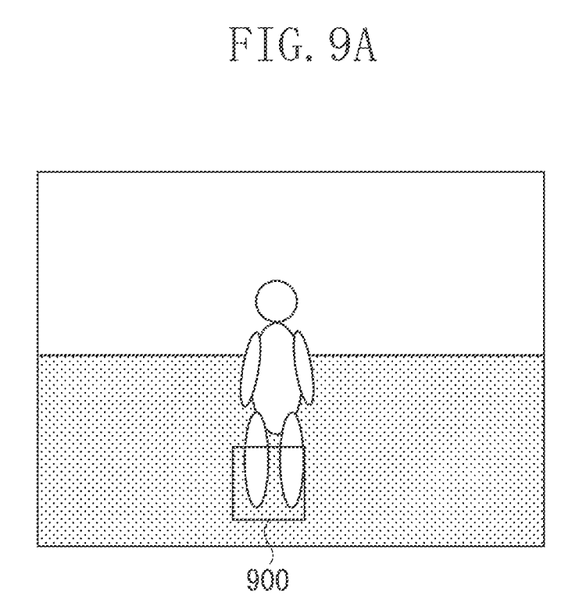
FIGS. 9A, 9B, and 9C are diagrams illustrating results of segmentation based on a cluster center.
Figure 9B:
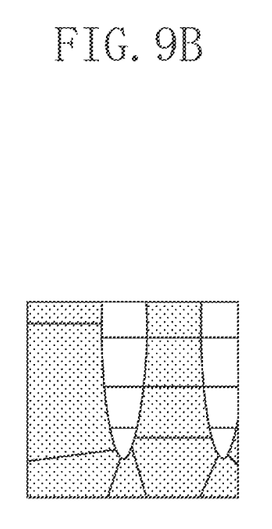
Figure 9C:
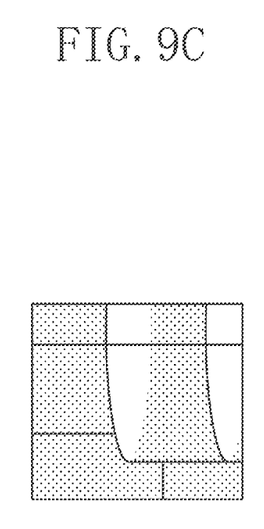

FIG. 8A illustrates an example of an image where the cluster center is set by the method described above. Also, FIG. 8B illustrates an example where the cluster centers are set at regular intervals by a conventional method. Furthermore, FIG. 9B illustrates a result of segmentation of a rectangular portion 900 in FIG. 9A based on the cluster center by the process of the present exemplary embodiment. Additionally, as a comparative example, FIG. 9C illustrates a result of segmentation of the rectangular portion 900 in FIG. 9A based on the cluster center by a conventional process. Since, according to the present exemplary embodiment, cluster centers are densely set near the boundary of the person, fine segmentation of regions is possible near the boundary of the person who is an important subject, with a smaller number of regions compared to the past.

In the first exemplary embodiment, an example of a process for segmenting an image into superpixels has been described based on a method discussed in "SLIC Superpixels", but an image may be segmented into superpixels also based on other methods. In the following, an example of segmenting an image into superpixels will be described based on a method discussed in "Efficient graph-based image segmentation" using graph representation. Additionally, the structure of the image processing apparatus according to the present exemplary embodiment is the same as that of the first exemplary embodiment, and redundant description thereof will be avoided. Also, the flow for acquiring image data and classifying an image into a plurality of regions is the same as that in FIG. 2, and redundant description thereof will be avoided.

Figure 10:
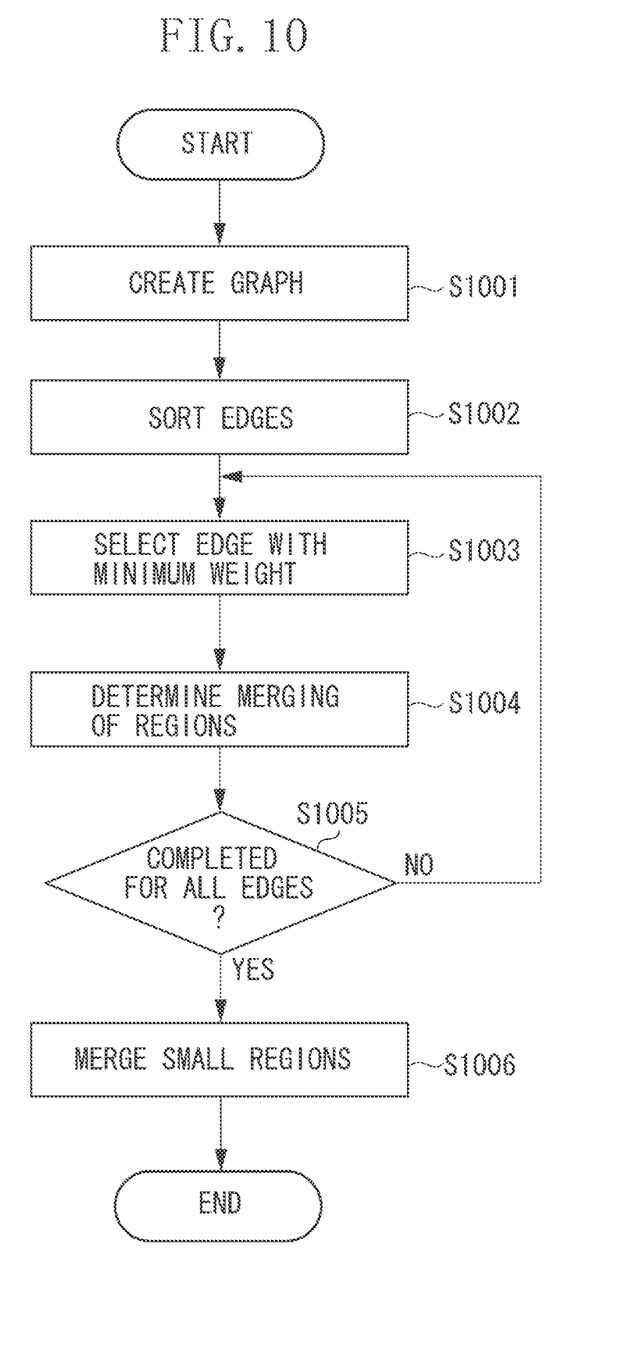
FIG. 10 is a flow chart illustrating an example of a detailed procedure of a region segmentation process according to a second exemplary embodiment.

FIG. 10 is a flow chart illustrating an example of a procedure of region segmentation of step S204 in FIG. 2 according to the present exemplary embodiment.

First, in step S1001, the region segmentation unit 104 creates a graph where each pixel in an input image is a vertex, and where combinations of each pixel and eight adjacent pixels surrounding the pixel are edges.

Next, in step S1002, the region segmentation unit 104 calculates the weight of all the edges in the graph created in step S1001, and performs sorting in the increasing order of edge weights. The region segmentation unit 104 calculates an edge weight $w_{ij}$ by the following equation (5).

$$w_{ij} = \sqrt{(R_i - R_j)^2 + (G_i - G_j)^2 + (B_i - B_j)^2} \quad (5)$$

Here, $(R_i, G_i, B_i)$ and $(R_j, G_j, B_j)$ are RGB components of pixels corresponding to vertices i and j of an edge, respectively. That is, here, a distance between two pixels in an RGB color space is the edge weight.

Next, in step S1003, the region segmentation unit 104 selects an edge with the smallest weight from the graph created in step S1001, by referring to the result of sorting in step S1002. Then, in step S1004, the region segmentation unit 104 searches, with respect to each pixel corresponding to a vertex of the edge selected in step S1003, for a region including the pixel, and performs determination regarding merging of the regions. Incidentally, in the initial state, a unit of the region is pixel itself. The determination regarding merging of the regions is performed based on comparison between the difference between the feature amounts of the two regions and the difference between the feature amounts in respective regions, and the edge weight calculated in step S1002 is used. The difference between the regions $\text{Dif}(C_i,C_j)$ is calculated by the following equation (6).

$$\text{Dif}(C_i,C_j)=\min(w_{kl}) \tag{6}$$

Here, $C_i$ and $C_j$ are the two regions to be determined, and $\min(w_{k1})$ is the smallest value of the edge weights calculated in step S1002 among the edges of a vertex (a pixel) k belonging to the region $C_i$ and a vertex (a pixel) l belonging to the region $C_j$. Also, the internal differences of the regions $\text{MInt}(C_i,C_j)$ are calculated by the following equation (7).

$$M\text{Int}(C_i,C_j)=\min\{\text{Int}(C_i)+\tau(C_i),\text{Int}(C_j)+\tau(C_j)\} \tag{7}$$

Here, $\text{Int}(C)$ is equal to $\max(w_{kl})$, and is the maximum value of the edge weights calculated in step S1002 among the edges of two vertices belonging to the region C, the vertex (pixel) k and the vertex (pixel) l. Also, $\tau(C)$ is equal to $K_c/|C|$, and $|C|$ is the area of the region C, and $K_c$ is a parameter controlling the likelihood of merging of the regions.

In step S1004, in the case the difference between the regions $\text{Dif}(C_i,C_j)$ is greater than the internal differences of the regions $\text{MInt}(C_i,C_j)$, the region segmentation unit 104 determines that merging is not to be performed because the difference between the two regions is great. On the other hand, in other cases, the region segmentation unit 104 determines that the two regions are similar to each other, and determines to merge the regions. In the case of merging the regions, $\text{Int}(C)$ is updated for the region after merging.

Next, in step S1005, the region segmentation unit 104 determines whether the process has been performed on all the edges. If the result of the determination indicates that there is an edge that is yet to be processed (NO in step S1005), the operation returns to step S1003, and, if all the edges have been processed (YES in step S1005), the operation proceeds to S1006. Then, in step S1006, the region segmentation unit 104 determines the sizes of all the regions, merges neighboring regions to obtain a region with a predetermined size or smaller, and ends the process. A merged and created region, as a result, is the superpixel.

Next, a method for using an object detection result for the region segmentation process which is based on graph representation described above will be described. In the process for setting a parameter in step S203 in FIG. 2, the maximum size $S_{zmax}$ of a region after merging is set according to the position in the image to perform the region merge determination in step S1004 in FIG. 10. That is, the maximum size $S_{zmax}$ of a region is set to a predetermined value $S_{0zmax}$ for the region outside the rectangle 501 illustrated in FIG. 5B. On the other hand, with respect to the region inside the rectangle 501, the maximum size $S_{zmax}$ of a region is set for each position based on the prior probability of each position inside the rectangle 501 being the boundary of the person, as in the first exemplary embodiment. That is, the maximum size $S_{zmax}$ is set according to the following equation (8).

$$S_{zmax}=K_{zmax}\cdot p(x|c) \tag{8}$$

Here, $K_{zmax}$ is a predetermined constant, and is set such that $S_{zmax}$ is equal to or smaller than $S_{0zmax}$.

In the process for performing the region merge determination in step S1004 in FIG. 10, the region segmentation unit 104 obtains the size of a merged region before the merge determination, from the sizes of two regions which are the target of merging, and determines whether the obtained size exceeds the maximum size $S_{zmax}$ of a region set in step S203. Then, in the case the size of the merged region exceeds the maximum size $S_{zmax}$ of a region, the region segmentation unit 104 determines that the regions are not to be merged. On the other hand, in the case the size of the merged region does not exceed the maximum size $S_{zmax}$ of a region, the region segmentation unit 104 performs determination regarding merging of the regions, and determines that the two regions are to be merged in the case the regions are determined to be similar. By adaptively setting the maximum size of a merged region for near the boundary of a person and for the rest, periphery of the boundary of a person who is an important subject may be finely segmented with a smaller number of regions compared to the past.

Additionally, in the second exemplary embodiment, the region segmentation process is controlled based on the maximum size of a merged region, but control by other methods are also possible. For example, in step S203, a parameter $K_c$ for controlling the likelihood of merging of regions in the process of step S1004, is set according to the detected position of an object. Accordingly, by setting a smaller parameter $K_c$ for near the boundary of a person than for other regions, merging of regions may be made less likely near the boundary than in other regions.

Also, in the present exemplary embodiment described above, the parameter is set in step S203 to control the size of a region and to perform fine segmentation of regions near the boundary of a detected person, but the parameter may also be set to control the number of regions. For example, in the case of performing the region segmentation process based on a method discussed in "Efficient graph-based image segmentation", the parameter $K_c$, described above, for controlling the likelihood of merging of regions is set to a plurality of different values near the boundary of a person. Then, in step S204, the number of regions near the boundary of a person is increased when the region segmentation unit 104 segments an image into regions based on respective parameters. Also, at this time, since segmented regions overlap one another, an output $F_{out}$ obtained for each superpixel in step S206 is added for the overlapping pixels, and a class returning the greatest value with respect to the sum of output values is output as the determination result.

According to the method described above, if, among results of region segmentation near the boundary of a person by a plurality of parameters, a boundary is obtained with high accuracy in any of the processing results, the accuracy of boundary for segmenting an image into a plurality of meaningful regions may be increased. Additionally, a parameter for setting a plurality of values is not limited to the parameter $K_c$ for controlling the likelihood of merging of regions. The same effect may be achieved also by applying region segmentation processes according to a plurality of different methods near the boundary of a detected person because the number of regions may be increased near the boundary of a person. For example, processes based on methods discussed in "SLIC Superpixels" and "Efficient graph-based image segmentation" are applied near the boundary of a person.

Furthermore, according to each of the exemplary embodiments described above, the periphery of the boundary of a person is finely segmented by using the result of detecting a person, but the exemplary embodiments of the present invention are also applicable to control of boundaries of regions other than a person. For example, when the position of a person in an image is detected, the position of the sky may be estimated based on the result. The sky generally occupies a large region in an image, and, thus, the parameter may be set such that the region above the position detected by using the result of detecting a person will be larger than other regions.

Moreover, according to each of the exemplary embodiments described above, the result of a person detection process is used, but the result of a face detection process may also be used, for example. Also, in the case of capturing the same scene, as with a surveillance camera, the difference in the background between a background image and an input image may be used. That is, the exemplary embodiments of the present invention may be applied while taking a change region obtained by the process for extracting a difference in the background as an object region.

According to the exemplary embodiments described above, the boundary between objects may be extracted with high accuracy while preventing the number of superpixels to be obtained by segmentation from becoming too large.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-183451 filed Aug. 22, 2012, which is hereby incorporated by reference herein in its entirety.

What is claimed is:

1. An image processing apparatus comprising a memory and at least one processor which function as:
   an object detection unit configured to detect an object region based on an input image;
   a setting unit configured to set parameters for controlling sizes of regions to be obtained by segmenting the image at respective positions in the image, where a first parameter set for a region outside the object region is a constant and a second parameter set for a position inside the object region is determined in accordance with that position; and
   a segmentation unit configured to segment the image into a plurality of regions, each of which includes adjacent similar pixels and sizes of the regions outside the object region are controlled to be approximately same by the first parameter and sizes of the regions near a boundary of the object region are controlled to be smaller than other regions by the second parameter.

2. The image processing apparatus according to claim 1, wherein the setting unit sets an interval of cluster centers as a parameter, and
   wherein the segmentation unit segments the image by clustering of pixels.

3. The image processing apparatus according to claim 1, wherein the setting unit sets, as a parameter, a maximum size of a region to be created by repetitive merging of regions whose smallest unit is a pixel, and
   wherein the segmentation unit segments the image based on a unit of the region created by the repetitive merging of regions, according to the set parameter.

4. The image processing apparatus according to claim 1, wherein the setting unit sets a parameter for controlling likelihood of merging of regions whose smallest unit is a pixel, and
   wherein the segmentation unit segments the image based on a unit of a region to be created by repetitive merging of regions, according to the set parameter.

5. The image processing apparatus according to claim 1, wherein the setting unit sets a number of regions for each position in the image as a parameter.

6. The image processing apparatus according to claim 5, wherein the segmentation unit segments the image in such a way that the number of regions to be obtained at a boundary area of the detected object becomes larger than regions to be obtained for other areas.

7. The image processing apparatus according to claim 6, wherein the setting unit sets a plurality of different parameters at the boundary area of the detected object, and for controlling likelihood of merging of regions whose smallest unit is a pixel,
   wherein the segmentation unit segments the image into a plurality of regions according to the parameters set by the setting unit.

8. The image processing apparatus according to claim 6, wherein the segmentation unit performs segmentation at the boundary area of the detected object by a plurality of different methods.

9. The image processing apparatus according to claim 1, further comprising a classification unit configured to extract feature amounts from respective regions which have been obtained by the segmentation unit, and to classify the respective regions into a plurality of classes, according to the extracted feature amounts.

10. An image processing method comprising:
    detecting an object region in an input image;
    setting parameters for controlling sizes of regions to be obtained by segmenting the image at respective positions in the image, where a first parameter set for a region outside the object region is a constant and a second parameter set for a position inside the object region is determined in accordance with that position; and
    segmenting the image into a plurality of regions, each of which includes adjacent similar pixels and sizes of the regions outside the object region are controlled to be approximately same by the first parameter and sizes of the regions near a boundary of the object region are controlled to be smaller than other regions by the second parameter.

11. A non-transitory computer-readable storage medium storing a program that causes a computer to execute:
    detecting an object region based on an input image;
    setting parameters for controlling sizes of regions to be obtained by segmenting the image at respective positions in the image, where a first parameter set for a region outside the object region is a constant and a second parameter set for a position inside the object region is determined in accordance with that position; and segmenting the image into a plurality of regions, each of which includes adjacent similar pixels and sizes of the regions outside the object region are controlled to be approximately same by the first parameter and sizes of the regions near a boundary of the object region are controlled to be smaller than other regions by the second parameter.

* * * * *